United States Patent [19]
Zumeta et al.

[11] 3,791,658
[45] Feb. 12, 1974

[54] PACKINGS FOR PUMPS, VALVES, AND THE LIKE

[75] Inventors: Julio Zumeta, New York, N.Y.; Edward M. Case, Weston, Conn.

[73] Assignee: The Marlo Company, Inc., New York, N.Y.

[22] Filed: May 7, 1971

[21] Appl. No.: 141,448

Related U.S. Application Data

[63] Continuation of Ser. No. 688,806, Dec. 7, 1967, abandoned.

[52] U.S. Cl. ............................................. 277/230
[51] Int. Cl. ............................................. F16j 15/10
[58] Field of Search ... 277/227, 228, 229, 230, 231, 277/232, DIG. 3; 156/293, 301, 311

[56] References Cited
UNITED STATES PATENTS 2,717,025  9/1955  Jelinek .............................. 156/311
3,108,818  10/1963  Lewis .............................. 277/DIG. 3
1,930,766  10/1933  Moore .............................. 277/230 X Primary Examiner—Louis R. Prince
Assistant Examiner—Robert I. Smith
Attorney, Agent, or Firm—Blum, Moscovitz, Friedman & Kaplan

[57] ABSTRACT

A packing for fluid-tightly sealing movable elements of pumps, valves, and the like. The packing comprises an inner Teflon-(a trade mark hereinafter referred to as TFE) containing core and an outer carbon-containing jacket surrounding the core. This core may be made of TFE fiber or of a TFE-impregnated packing material such as asbestos or fiberglass, while the outer jacket can be composed of graphite filament either wrapped or braided around the core.

7 Claims, 2 Drawing Figures

INVENTORS
JULIO ZUMETA
EDWARD M. CASE

PACKINGS FOR PUMPS, VALVES, AND THE LIKE

BACKGROUND OF THE INVENTION

This application is a continuation of application Ser. No. 688,806 filed Dec. 7, 1967, now abandoned.

The invention relates to packings for fluid-tightly sealing movable components of pumps, valves, and the like.

Conventional packings of this type include two important categories. One of these categories is Teflon packings, including those made of pure TFE fiber as well as those made of other fibers to which is added a TFE dispersion, resulting in a TFE-impregnated structure. The other important category includes packings made of carbon such as graphite fiber or filament.

Each of these categories has its own inherent drawbacks.

Thus, in the case of TFE packings, it is well known that unless considerable care is taken in the installation of such a packing, a sintering effect on the TFE wearing surface occurs. This effect, as a result of the rapid build-up of heat under frictional rod contact, for example, which is further accelerated by sealing take-up (and which is a result, also, of poor heat transmission properties of Teflon) results in a hard-abrasive surface causing the moving rod or shaft to wear rapidly and resulting in packing "burn-out." As a result of these inherent limitations, all packing manufacturers, under advice given by E. I. DuPont de Nemours Inc., instruct TFE packing users to install the packing with very great care so as to avoid heavy take-up and to permit a lubricating seepage or drip through the stuffing box at all times. In the absence of such seepage or drip of the lubricant packing burn-out will occur.

These limitations prevent TFE packings from being used effectively, since in many toxic, noxious, explosive, or severely corrosive applications it is highly desirable, if not essential, to have a completely dry and leak-proof packing installation.

Graphite filament packing, on the other hand, while it does not have the undesirable sintering properties of TFE packings, will burn-out particularly under operating conditions of high temperature, if there is excessive compression at the stuffing box. It is well known that in the case of graphite filament packings it is difficult to avoid excessive compressions. One reason for this difficulty results from the compacting quality of the graphite filament packing. This latter quality gives the graphite filament packing a lack of resiliency or "bounce" (in itself a deficiency in terms of sealing effectiveness with respect to a moving rod or shaft or misaligned valve stem) with a resulting lack of "feel" in the compressive or take-up procedure. Thus, as a practical matter an operator cannot determine from the resistance of the packing when sufficient take-up pressure has been exerted in normal installation or maintenance operations.

This lack of feel with such packings, the development of which feel is an essential and well known factor in the training and efficiency of maintenance engineers and mechanics, is in sharp contrast with the feel which can be obtained in virtually all other widely used conventional packing materials such as asbestos, flax, lead, etc. This inherent lack of resistance thus will frequently result in burning-out of graphite filament packing owing to overcompression which cannot be avoided.

On the other hand pure graphite filament packing material is inherently porous. It has voids between the strands, and in order to provide a proper seal frequent adjustments of the compression of the packing are required. Inasmuch as such compression, for the reasons set forth above, is difficult to regulate, there is an inherent lack of denseness in this type of packing, resulting in installation and maintenance procedures which are inherently unfavorable for continuous successful operation.

SUMMARY OF THE INVENTION

It is thus a primary object of the present invention to provide a packing of the above general type which will avoid the drawbacks inherent in the above categories of packing.

In addition, it is an object of the invention to provide a packing which will retain the virtues of the above categories of packings.

Thus, it is a more specific object of the present invention to provide a packing which will combine the inherent virtues of a Teflon type and carbon type of packing in such a way that the virtues of one of these types will complement the virtues of the other while at the same time neutralizing the above-described inherent deficiencies of each type of packing by the beneficial effects resulting from the combination of the invention.

The above objects are achieved with the present invention by providing a packing which includes an inner Teflon-containing core and an outer carbon-containing jacket which surrounds the core. Thus, the core of the packing of the invention can be made either of TFE fiber, TFE strands or some type of commonly used TFE-impregnated packing material, such as white asbestos, blue asbestos, fiberglass, etc., or some TFE filled material, and about this core there is an outer carbon-containing jacket of graphite filament, for example, which may be braided about the inner core or which may be wrapped about the inner core, or other means of forming a jacket besides braiding may be used.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF PREFERRED EMBODIMENTS

Figure 1:
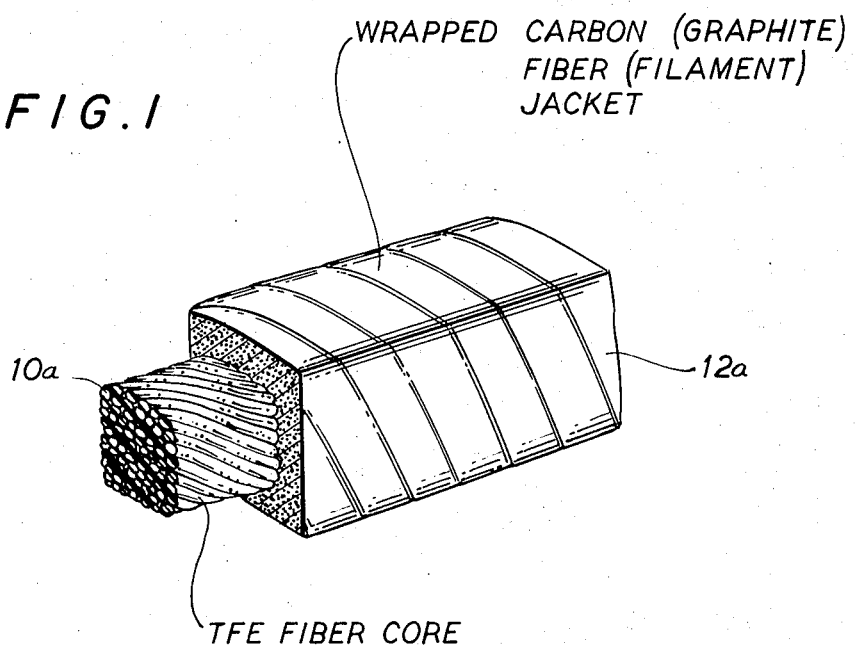
FIG. 1 is a schematic fragmentary partly sectional illustration of one possible embodiment of a packing of the invention.
Figure 2:
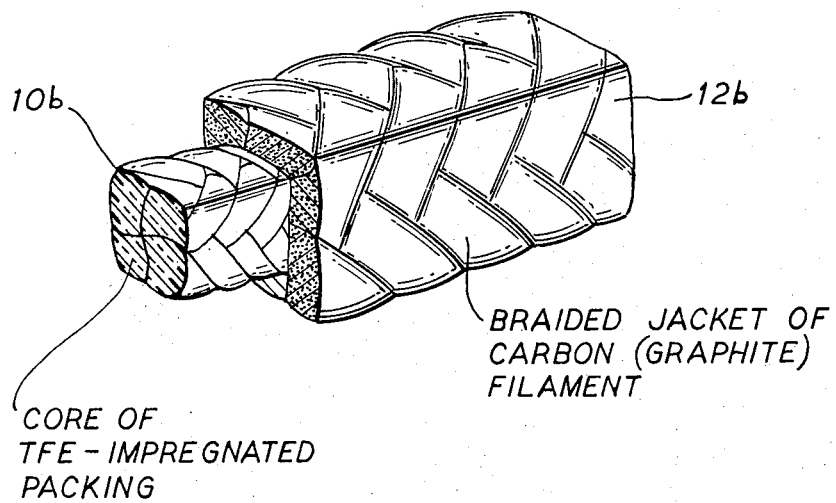
FIG. 2 is a schematic partly sectional fragmentary illustration of another embodiment of a packing of the invention.

Referring to the drawings, it will be seen that the embodiment of FIG. 1 includes a core 10a made of TFE fiber while in the embodiment of FIG. 2 the core 10b is made of TFE-impregnated packing material. As was indicated above, this packing material may be, for example white asbestos, blue asbestos, fiberglass, etc. The fiber core 10a of FIG. 1 may be bleached Teflon TFE fluorocarbon available from the duPont Company as number 4050–540–0 (4050 denier, 540 filament), and these fibers are twisted into a bundle which forms the core 10a.

In the case of FIG. 2, the TFE-impregnated packing may, for example, take the form of 30 to 45 weight per cent polytetrafluoroethylene in the form of impregnation for a braided glass fiber core, for example. The amount of Teflon impregnating the packing material of the core 10b can of course be varied, and the impregnating polytetrafluoroethylene polymer is in non-fibrous form and in the uncured state. In FIG. 1 the core 10a is polytetrafluoroethylene in fibrous form.

Braided glass fibers which form the core 10b of FIG. 2, for example, may be immersed in a polytetrafluoroethylene (Teflon) dispersion identified as TD-3 by duPont which contains approximately 60 percent by weight Teflon, 6 percent (by weight of Teflon) wetting agent and the remainder, water. For a one half inch packing the time of immersion may be 2 minutes and the packing is then air dried and calendered to size.

In FIG. 1 the core 10a is surrounded by a carbon jacket 12a in the form of suitable graphite filament which is wrapped around the core. In FIG. 2, however, the carbon jacket 12b is in the form of braided carbon filament.

Thus, the jackets 12a and 12b are made of carbon filament in graphitic form, inasmuch as graphite filaments are stronger than carbon filaments in other forms. The graphite filaments may be in the form of graphite yarn GY-2-10 (high twist) available from the Carborundum Company, Sanborn, N.Y. However, other suitable carbon filaments may be used.

With the above-described structure of the invention it is possible to use, without attenuating or reducing its anti-corrosive effectiveness, a packing which is in its largest mass either Teflon or TFE-impregnated, without making it essential to provide for seepage or drip through the stuffing box in order to avoid sintering and consequent burn-out. In the past it would always have been feasible to cover a TFE core of any type with a non-TFE material. However, such an expedient would have negated the very purpose for which the TFE is employed, since if such a covering could resist the chemical attack encountered in a given application, the TFE component would not be required, and if the covering could not resist such an attack then it would quickly be destroyed and the TFE structure would then be the active mechanical agency and would be subject to the deficiencies described above. It is only with the development of carbon in the form of graphite yarn, for example, that a material substantially equal to TFE in chemical resistance on virtually all applications has been available to thus make it possible to contain an effective sealing core of TFE in some form.

As a result of the heat-conducting characteristics of graphite filament, at any given temperature more heat will be conducted away from the packing through the wall of the stuffing box than would be possible with any form of TFE packing unaccompanied by the graphite filament component. The result is an elevation in the effective temperature limit at which TFE can be used in a stuffing box. The effective limit of TFE alone is determined by the point at which the sintering effect occurs. However, the sintered product retains its structural integrity and could be utilized until a higher temperature is reached, if it were not for the undesirable effect of the hard-sintered product on a moving component such as a pump shaft. Inasmuch as the graphite filamet jacket retains its anti-frictional properties and is not affected by elevated temperatures, it effectively separates any interior sintering of the core from engagement with the moving shaft and thereby prevents the above-mentioned injurious effects and prolongs the life both of the packing and of the moving shaft or other moving component.

Furthermore, the interior core 10a or 10b provides a dense, more resilient internal structure which eliminates the difficulties and dangerous consequences of a packing composed entirely of graphite filament, as set forth above. In this way it is possible to provide better control and regulation of the installation and the seating pressures can be controlled with a high degree of accuracy, reducing the possibility of packing failure and shaft damage. Thus, the desirable anti-frictional and heat-transmitting characteristics of graphite filament are retained while the negative characteristics of porosity and lack of resiliency thereof are eliminated.

In addition, the packing of the invention is much less expensive than a pure graphite filament packing inasmuch as at the present time the cost of graphite filament is approximately $40.00 per pound, as opposed to a cost of approximately $8.25 per pound for pure TFE fiber and approximately $2.50 per pound for other TFE impregnated core materials.

Inasmuch as the completely finished packing of the invention, whatever the core material may be, will contain only a relatively small percentage of graphite filament by weight, the packing will provide a very substantial cost saving to the consumer.

What is claimed is:

1. A packing for fluid-tightly sealing movable elements of pumps, valves, and the like, comprising an inner resilient core made of a fibrous material selected from the group consisting of Teflon, Teflon-impregnated fiberglass, and Teflon-impregnated asbestos, and an outer jacket surrounding and directly engaging said core for enclosing the latter, said jacket having the form of a tubular body of filamentary graphite and having a thickness great enough to conduct away a substantial portion of whatever heat is generated when said jacket is in contact with a movable element, thereby protecting said resilient core from thermal degradation.

2. The packing of claim 1 and wherein said core is made of braided Teflon-containing packing material.

3. The packing of claim 2 and wherein the packing material is asbestos.

4. The packing of claim 2 and wherein the packing material is fiberglass.

5. The packing of claim 1 and wherein the jacket is made of graphite filament.

6. The packing of claim 1 and wherein said jacket is braided around said core.

7. The packing of claim 1 and wherein said core is a Teflon-containing asbestos and said jacket is a braided graphite filament.

* * * * *